United States Patent
Hebert et al.

(10) Patent No.: US 9,619,459 B2
(45) Date of Patent: *Apr. 11, 2017

(54) SITUATION AWARE NLU/NLP

(71) Applicant: Nuance Communications, Inc., Burlington, MA (US)

(72) Inventors: Matthieu Hebert, Melocheville (CA); Jean-Philippe Robichaud, Mercier (CA); Christopher Parisien, Montreal-Quest (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,380

(22) Filed: Oct. 1, 2012

(65) Prior Publication Data

US 2014/0095147 A1    Apr. 3, 2014

(51) Int. Cl.
*G06F 17/27* (2006.01)
*G06F 17/30* (2006.01)
*G06F 17/28* (2006.01)

(52) U.S. Cl.
CPC .... *G06F 17/2785* (2013.01); *G06F 17/30976* (2013.01); *G06F 17/28* (2013.01)

(58) Field of Classification Search
CPC .................................................. G06F 17/28
USPC .............................................................. 704/9
See application file for complete search history.

(56) References Cited

U.S. PATENT DOCUMENTS

| | | | | |
|---|---|---|---|---|
| 6,278,967 B1* | 8/2001 | Akers | .................... | G06F 17/271 704/2 |
| 6,278,968 B1* | 8/2001 | Franz | .................. | G06F 17/2765 345/171 |
| 6,760,695 B1* | 7/2004 | Kuno | .................... | G06F 17/271 704/2 |
| 7,085,708 B2* | 8/2006 | Manson | ................ | G06F 17/271 704/1 |
| 7,363,398 B2* | 4/2008 | Scott | ........................ | G06F 3/038 340/5.5 |
| 7,464,026 B2* | 12/2008 | Calcagno | .............. | G06F 17/279 704/270 |
| 7,716,056 B2* | 5/2010 | Weng | .................... | G06F 17/278 704/10 |
| 2004/0019588 A1* | 1/2004 | Doganata | ............ | G06F 17/3064 |
| 2005/0278287 A1* | 12/2005 | Bao | .................. | G06F 17/30663 |
| 2008/0033938 A1* | 2/2008 | Okamoto | .......... | G06F 17/30731 |
| 2008/0306959 A1* | 12/2008 | Spivack | ............. | G06F 17/3089 |

(Continued)

OTHER PUBLICATIONS

Sullivan (2007): "Google Search History Expands, Becomes Web History"; http://searchengineland.com/google-search-history-expands-becomes-web-history-11016.*

(Continued)

*Primary Examiner* — Pierre-Louis Desir
*Assistant Examiner* — Forrest F Tzeng
(74) *Attorney, Agent, or Firm* — Banner & Witcoff, Ltd.

(57) ABSTRACT

An arrangement and corresponding method are described for natural language processing. A natural language understanding (NLU) arrangement processes a natural language input to determine a corresponding sentence-level interpretation. A user state component maintains user context data that characterizes an operating context of the NLU arrangement. Operation of the NLU arrangement is biased by the user context data.

20 Claims, 3 Drawing Sheets

(56) References Cited

U.S. PATENT DOCUMENTS

| | | | |
|---|---|---|---|
| 2009/0030697 A1 | 1/2009 | Cerra et al. | |
| 2009/0319498 A1* | 12/2009 | Zabokritski | G06F 17/30427 |
| 2010/0076995 A1* | 3/2010 | Pan | G06F 17/30646 |
| | | | 707/770 |
| 2011/0087673 A1* | 4/2011 | Chen | G06F 17/30864 |
| | | | 707/748 |
| 2012/0016678 A1* | 1/2012 | Gruber et al. | 704/275 |
| 2013/0086025 A1* | 4/2013 | Hebert | 707/706 |
| 2013/0086026 A1* | 4/2013 | Hebert | 707/706 |
| 2013/0086027 A1* | 4/2013 | Hebert | 707/706 |
| 2013/0086028 A1* | 4/2013 | Hebert | 707/706 |
| 2013/0086029 A1* | 4/2013 | Hebert | 707/706 |
| 2013/0268522 A1* | 10/2013 | Barrett | G06F 17/30873 |
| | | | 707/723 |
| 2013/0332450 A1* | 12/2013 | Castelli | G06F 17/278 |
| | | | 707/722 |
| 2014/0297268 A1* | 10/2014 | Govrin | G06Q 40/02 |
| | | | 704/9 |

OTHER PUBLICATIONS

Sullivan, http://searchengineland.com/google-search-history-expands-becomes-web-history-11016.*

* cited by examiner

SITUATION AWARE NLU/NLP

TECHNICAL FIELD

The present invention relates to natural language processing that includes user context information.

BACKGROUND ART

Natural Language Processing (NLP) and Natural Language Understanding (NLU) involve using computer processing to extract meaningful information from natural language inputs such as human generated speech and text. One recent application of such technology is processing speech and/or text queries in mobile devices such as smartphones.

FIG. 1 shows some example screen shots of one such mobile device application, Dragon Go!, which processes speech query inputs and obtains simultaneous search results from a variety of top websites and content sources. Such applications require adding a natural language understanding component to an existing web search algorithm in order to extracting semantic meaning from the input queries. This can involve using approximate string matching to discover semantic template structures. One or more semantic meanings can be assigned to each semantic template. Parsing rules and classifier training samples can be generated and used to train NLU models that determine query interpretations (sometimes referred to as query intents).

SUMMARY

Embodiments of the present invention are directed to an arrangement and corresponding method for natural language processing. A natural language understanding (NLU) arrangement processes a natural language input to determine a corresponding sentence-level interpretation. A user state component maintains user context data that characterizes an operating context of the NLU arrangement. Operation of the NLU arrangement is biased by the user context data.

The NLU arrangement may use rule-based NLU and/or statistical-based NLU, semantic templates and/or a mention detection approach for processing the natural language input. In addition, the NLU arrangement may process the natural language input using multiple parallel domain pipelines, each representing a different specific subject domain of related concepts. The natural language input may be developed by a mobile device. The NLU arrangement may process the natural language input with minimum response latency.

DETAILED DESCRIPTION

Current NLU arrangements are state-less and do not reflect any notion of what the user is currently doing or what he has done in the past. Embodiments of the present invention are directed to an arrangement for natural language processing of natural language inputs, such as a speech input query from a smartphone or other mobile device, based on user state component maintains user context data that characterizes an operating context of the NLU arrangement.

Figure 1:
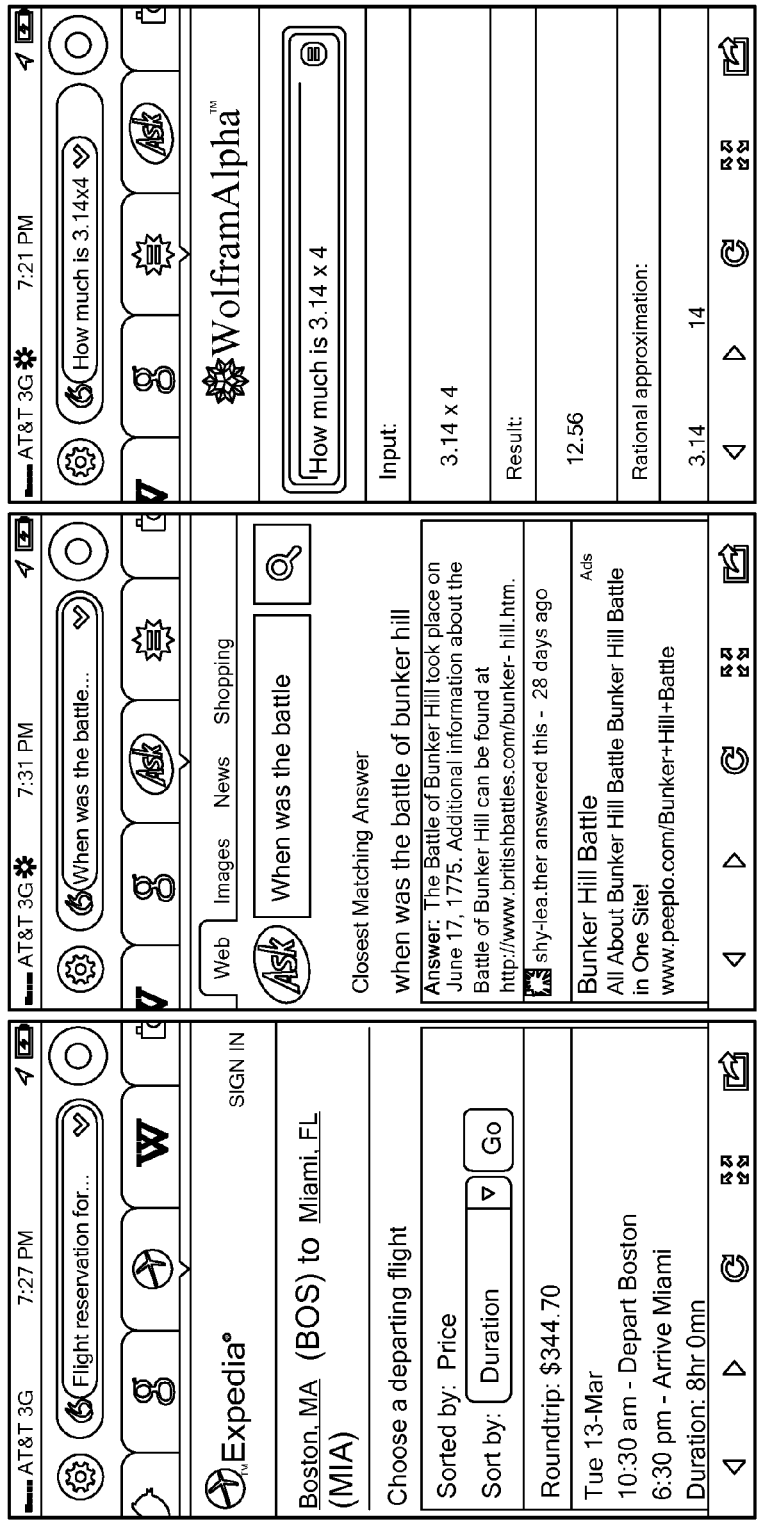
FIG. 1 some example screen shots of a natural language query application for a mobile device.
Figure 2:
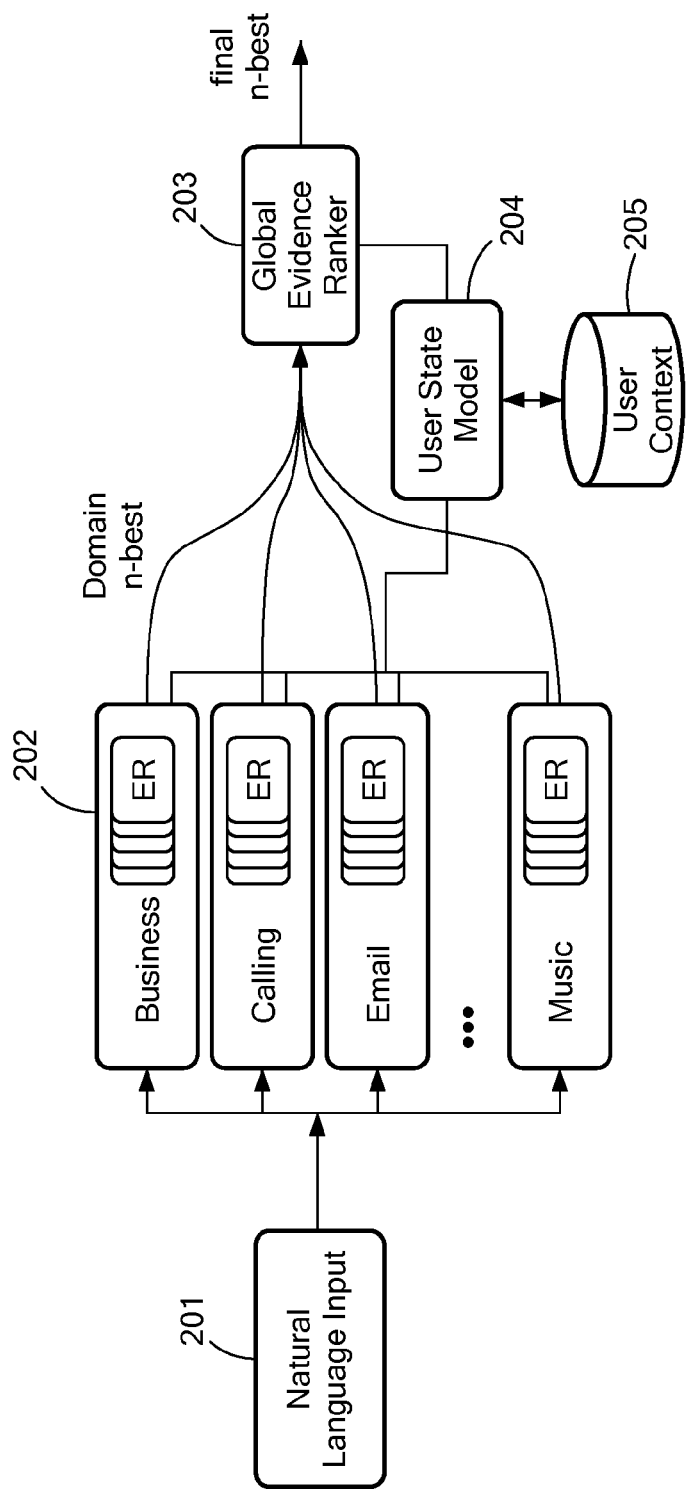
FIG. 2 shows an example of a multi-domain natural language processing arrangement that uses user context data according to an embodiment of the present invention.

FIG. 2 shows one example of a multi-domain NLU arrangement that uses user context data according to an embodiment of the present invention, with multiple parallel domain pipelines, each representing a different specific subject domain of related concepts. Given a natural language query input 201 such as "search for schedule of miami heat," each domain pipeline 202 assigns specific tags to groups of words within the query that represent individual semantic concepts (e.g., a date, a movie name, etc.) which we refer to as mentions. For example:

[IntentSearch] search for [/IntentSearch]
[SportTeam] miami heat [/Sport Team]

Individual mentions may also receive additional semantic attachments (SemAtt) representing additional associated relationship information. For example, the mention, SportTeam="Miami Heat", may have a SemAtt, TeamURL=www.nba.com/heat. Domain expert interpreters within each domain pipeline 202 are then used to process the mentions and semantic attachments to determine domain interpretation candidates that represent the query. The outputs of all the parallel domain pipelines 202 are funneled together and applied to a global evidence ranker 203 which is typically (but not necessarily restricted to) a classifier trained on relevant data and using features from the domain experts as well as other external sources—for example, current list of in-theater movies, list of popular songs, etc.—to determine a final output interpretation that represents the initial natural language input 201.

Figure 3:
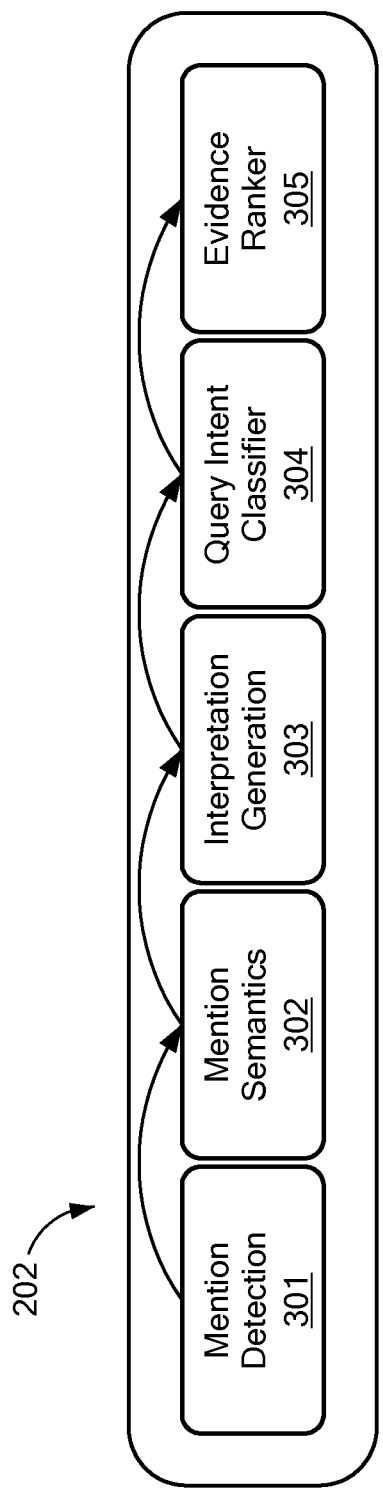
FIG. 3 shows an example of various functional blocks within one of the domain pipelines.

FIG. 3 shows an example of various functional blocks within one specific embodiment of a domain pipeline 202. Initially, a mention detection module 301 processes the natural language input to determine a corresponding N-Best list of mentions. Specific NLU algorithms may be grammar-based—i.e., rule-based for fast bootstrapping—and/or statistical-based for robustness—e.g., based on maximum entropy modeling using IBM SIRE technology. For example, typical statistical approaches may be based on statistical language modeling (SLM) and/or statistical semantic modeling (SSM). Mention semantics module 302 discovers additional semantic information ("semantic attachments") for specific mentions. An interpretation generator 303 is a domain expert interpreter that extracts relationships between mentions and blends the mentions together to form a rank-ordered domain output set of sentence-level interpretation candidates with confidence values. A query intent classifier 304 determines a query intent representing a semantic meaning of the natural language input to produce domain interpretation candidates. Domain evidence ranker 305 performs a semantic re-ranking of the interpretation candidates within the domain output set using a classifier trained on data representative of the task.

During operation of the NLU arrangement, a user state model 204 collects user context data 205 such as user activities (current and/or past), entities that the user frequently refers to, etc. In different specific embodiments, the user state model 204 may extract any and all meta-data that may be available in the natural language input 201 for use as user context data 205. In addition or alternatively, the stored user context data 205 may include various contextual information cures that are developed at the different processing stages of the NLU arrangement—i.e., by any or all of the processing stages within the individual domain pipelines 202 or by the global evidence ranker 203—including without limitation, classification tags, query intents, semantic interpretations, grammar data, modifier data, ate/time, etc.

Based on this user context data 205 the user state model 204 biases the operation of the NLU arrangement to reflect the user context in which the natural language input 201 is provided. In specific NLU arrangements such as the one shown in FIGS. 2 and 3, the user context data 205 and the user state model 204 may be used to influence the operation of the specific domain pipelines 202—e.g., the interpretation generator 303 and/or the evidence ranker 305. In addition or alternatively, the user context data 205 and the user state model 204 may be used to influence the operation of the global evidence ranker 203 (i.e., influencing the re-ranking), or even after the global evidence ranker 203 in post-processing the final N-best output. Ideally, the entire system should operate in real time to process the natural language input with minimum response latency.

For example, assume that the user of a mobile device has an open eBook application. The user then says: "harry potter". Even if Harry Potter also is a blockbuster movie series and a video game, the user state model 204 will bias the NLU arrangement in returning this natural language input 201 of "Harry Potter" as referring to a Book.

In another scenario, a user may say "book a table at Rialto tomorrow night at 8 pm for 8". The reservation is completed. The next day at around 8 pm, the user state model 204 biases the operation of the NLU arrangement towards interpretations reflecting that known user context data 205 that the user is dining with seven other people at a restaurant (of which the NLU arrangement knows the location). So if at 7:30 pm the user says "directions", the user state model 204 biases the operation of the NLU arrangement to return directions to the rialto restaurant referenced in the reservation stored in the user context data 205. And if the user says the next day: "book a taxi", the user state model 204 biases the NLU's interpretation to be aware that the person *might* require two taxis.

In another example, a user says "post status on Facebook: the avenger movie is great". Then the person searches for "Jackson on Wikipedia". Since the user context data 205 reflects the user's earlier like of "the avenger" movie, the user state model 204 biases the operation of the NLU arrangement to return the Wikipedia page for Samuel L. Jackson rather that Michael Jackson (or a disambiguation page from Wikipedia).

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A system for natural language processing comprising:
a computing device that receives natural language input from a user;
a data store storing a user state model comprising user context data that characterizes an operating context of the computing device;
memory storing instructions that, when executed by a processor of the computing device, cause the system to (a) perform a natural language understanding (NLU) process that produces a final interpretation of the natural language input and (b) bias performance of the NLU process using the user context data of the user state model;
wherein the NLU process comprises:
  processing the natural language input in parallel using a plurality of domain pipelines to produce, by each of the plurality of domain pipelines, one or more domain interpretation candidates, each domain pipeline representing a different subject domain of related concepts,
  ranking each of the domain interpretation candidates produced by the plurality of domain pipelines, and
  selecting, based on the ranking, one of the domain interpretation candidates produced by the plurality of domain pipelines as the final interpretation of the natural language input; and
wherein each domain pipeline comprises a plurality of stages, the plurality of stages comprising:
  a mention detection stage that assigns, to one or more words of the natural language input, a tag indicating a semantic concept of the subject domain represented by the domain pipeline,
  an interpretation stage that produces the one or more domain interpretation candidates, each domain interpretation candidate having a confidence value and the one or more domain interpretation candidates being ranked according to a confidence value for each domain interpretation candidate,
  a query intent classification stage that determines a query intent for the natural language input, and an evidence ranking stage that re-ranks the one or more domain interpretation candidates using a classifier trained on data representing the query intent.

2. A system according to claim 1, wherein the NLU process uses semantic templates for processing the natural language input.

3. A system according to claim 1, wherein the NLU process uses both rule-based NLU and statistical-based NLU for processing the natural language input.

4. A system according to claim 1, wherein the computing device is a mobile computing device that develops the natural language input.

5. A system according to claim 1, wherein the NLU process processes the natural language input in real-time.

6. A method for natural language processing comprising:
storing, at a data store of a computing device, a user state model comprising user context data that characterizes an operating context of the computing device;
receiving, at the computing device, natural language input from the user;
performing, by a processor of the computing device, a natural language understanding (NLU) process that produces a final interpretation of the natural language input;
wherein performance of the NLU process is biased using the user context data of the user state model;
wherein the NLU process comprises:
processing the natural language input in parallel using a plurality of domain pipelines to produce, by each of the plurality of domain pipelines, one or more domain interpretation candidates, each domain pipeline representing a different subject domain of related concepts,
ranking each of the domain interpretation candidates produced by the plurality of domain pipelines, and
selecting, based on the ranking, one of the domain interpretation candidates produced by the plurality of domain pipelines as the final interpretation of the natural language input; and
wherein each domain pipeline comprises a plurality of stages, the plurality of stages comprising:
a mention detection stage that assigns, to one or more words of the natural language input, a tag indicating a semantic concept of the subject domain represented by the domain pipeline,
an interpretation stage that produces the one or more domain interpretation candidates, each domain interpretation candidate having a confidence value and the one or more domain interpretation candidates being ranked according to a confidence value for each domain interpretation candidate,
a query intent classification stage that determines a query intent for the natural language input, and
an evidence ranking stage that re-ranks the one or more domain interpretation candidates using a classifier trained on data representing the query intent.

7. A method according to claim 6, wherein the NLU process processes the natural language input based on use of semantic templates.

8. A method according to claim 6, wherein the NLU process processes the natural language input using both rule-based NLU and statistical-based NLU.

9. A method according to claim 6, wherein the computing device is a mobile computing device and the natural language input is developed by the mobile device.

10. A method according to claim 6, wherein the NLU process processes the natural language input in real-time.

11. The system of claim 1 wherein the natural language input received from the user is natural language speech input.

12. The method of claim 6 wherein the natural language input received from the user is natural language speech input.

13. The system according to claim 1, wherein the plurality of stages of each domain pipeline further comprises a semantic attachment stage that attaches, to a mention of the natural language input, additional semantic information associated with the mention.

14. The system according to claim 1, wherein biasing performance of the NLU process comprises biasing the ranking of each of the domain interpretation candidates produced by the plurality of domain pipelines.

15. The system according to claim 1, wherein biasing performance of the NLU process comprises biasing at least one stage of the plurality of stages of each domain pipeline.

16. The system according to claim 1, wherein the ranking of each of domain interpretation candidates produced by the plurality of domain pipelines uses a classifier trained on data associated with the subject domains represented, respectively, by the plurality of domain pipelines.

17. The method according to claim 6, wherein the plurality of stages of each domain pipeline further comprises a semantic attachment stage that attaches, to a mention of the natural language input, additional semantic information associated with the mention.

18. The method according to claim 6, wherein biasing performance of the NLU process comprises biasing the ranking of each of the domain interpretation candidates produced by the plurality of domain pipelines.

19. The method according to claim 6, wherein biasing performance of the NLU process comprises biasing at least one stage of the plurality of stages of each domain pipeline.

20. The method according to claim 6, wherein the ranking of each of domain interpretation candidates produced by the plurality of domain pipelines uses a classifier trained on data associated with the subject domains represented, respectively, by the plurality of domain pipelines.

* * * * *